United States Patent [19]

Blach

[11] 4,334,785

[45] Jun. 15, 1982

[54] SHAFT FOR WORKING MATERIAL ON MACHINES FOR WORKING MATERIALS OF SOLID, LIQUID, PLASTIC AND/OR HIGHLY VISCOUS CONSISTENCY

[75] Inventor: Josef A. Blach, Asperg, Fed. Rep. of Germany

[73] Assignee: Automatik Apparate-Maschinenbau H. Hench GmbH, Groossostheim, Fed. Rep. of Germany

[21] Appl. No.: 160,593

[22] Filed: Jun. 18, 1980

[30] Foreign Application Priority Data

Jun. 18, 1979 [DE] Fed. Rep. of Germany ....... 2924462

[51] Int. Cl.³ .............................. B01F 7/08; B29B 1/04
[52] U.S. Cl. ...................................... 366/79; 198/666; 277/DIG. 6; 366/322
[58] Field of Search ....................... 366/88, 89, 90, 79, 366/322, 323, 83, 84, 85; 198/662, 666; 277/DIG. 6

[56] References Cited

U.S. PATENT DOCUMENTS

| | | | |
|---|---|---|---|
| 3,788,651 | 1/1974 | Brown | 277/DIG. 6 |
| 3,831,259 | 8/1974 | Goulas | 277/DIG. 6 |
| 3,884,452 | 5/1975 | Britten | 366/85 |
| 4,167,339 | 9/1979 | Anders | 366/79 |
| 4,193,696 | 3/1980 | Heel | 366/322 |

Primary Examiner—Robert W. Jenkins
Attorney, Agent, or Firm—Bernard, Rothwell & Brown

[57] ABSTRACT

A processing shaft for screw machines for working materials of solid, liquid, plastic or highly viscous consistency, which processing shaft comprises a driving shaft with several sleeve-type work segments mounted thereon. Clamping means are associated with each two of adjacent end faces of said work segments for sealingly pressing said adjacent end faces against each other in axial direction, and a gas-filled O-ring received in grooves of the adjacent end faces for being compressed between said end faces. Each of the grooves has an annular zone against which said O-ring is pressed and in which any machining indentations having a peak-to-valley height of more than 2 μm extend concentric to the driving shaft.

11 Claims, 8 Drawing Figures

SHAFT FOR WORKING MATERIAL ON MACHINES FOR WORKING MATERIALS OF SOLID, LIQUID, PLASTIC AND/OR HIGHLY VISCOUS CONSISTENCY

In machines for working materials of solid, liquid, plastic and/or highly viscous consistency, in particular, so-called screw machines, use is often made of shafts for working material comprising on a driven core shaft sleeve-type work segments which are constructed in accordance with the type of operation to be performed and are arranged in a row on the core shaft. For example, these work segments may have the shape of a section of a feed screw or a so-called kneading disc, which is a disc or sleeve whose external periphery deviates from a cylinder concentric with the core shaft axis. A disadvantage of these known shafts for working material which is felt, above all, in the plastic and food industries is that it has in the past not been possible to satisfactorily seal the areas of abutment between the end faces of adjacent work segments. The material to be worked can, therefore, enter at these areas of abutment between the work segments and undergo changes or cause reactions there which impair the further processing of the material to be worked and/or render difficult or even impossible subsequent separation of the work segments from one another and from the shaft. This sometimes results in the expensive work segments or entire shafts being no longer usable or in these shafts for working material, which on account of their versatility are, in fact, advantageous, having to be excluded from certain fields of application.

In the known material working shafts of the aforementioned kind, the abutting end faces of the work segments are planar ground on surface grinding machines and are pressed together by the entire set of work segments being clamped between a stop member provided at one end of the core shaft and a clamp bolt which is screwed into a threaded bore in the core shaft at the other end of the core shaft. Nevertheless, the areas of abutment between the work segments of the known shafts for working material are inadequately sealed. In this connection, it must also be remembered that the various regions of such a material working shaft normally have different temperatures merely on account of the fact that the energy passed from the material working shaft into the material being worked differs in amount along the shaft. However, different temperatures also result in different changes in length. Furthermore, the energy transferral produces a torsion and, consequently, a shortening of the material working shaft, so that the amounts of energy fluctuating along the shaft which have been passed into the material being worked per unit of length result in different shortenings in the various shaft regions. Furthermore, manufacturing and assembly tolerances unite with the fact that the individual work segments are interchanged and exchanged to hamper the maintenance of a minimum surface sealing pressure at the end faces of the work segments of the known shafts for working material. Even if the aforementioned causes of fluctuating surface sealing pressures are left aside, there is another factor which leads to relatively large differences in surface sealing pressures at the end faces of the work segments of the known material working shafts: the differently constructed regions of such a material working shaft cause great local pressure differences in the materials to be worked (which is certainly desired and necessary for the working of the material). However, these pressure differences created and reduced in relatively short shaft sections also lead to greatly differing and possibly fluctuating longitudinal tensile and longitudinal thrust stresses on the core shaft and possibly to inadequate surface sealing pressures at the end faces of the work segments.

The object underlying the invention is to so improve the known material working shafts of the above-mentioned kind that the areas of abutment between the work segments can be sealed to a more complete degree than hitherto. Based on a material working shaft, in particular, a screw shaft, comprising a core shaft with sleevetype work segments which are pushed onto the core shaft and are mounted for rotation therewith, and a clamping means for producing axial surface sealing pressures at the end faces of the work segments, this object is attained in accordance with the invention in that there is provided at the end faces to be sealed an endless groove extending around the core shaft for partial accommodation of an annular washer disposed between two respective end faces, and in that there is associated with each pair of adjacent end faces of work segments clamping means for producing the axial surface sealing pressure. It is particularly recommendable to machine the groove wall areas against which the annular washer is pressed such that the surface roughness with a peak-to-valley height exceeding a critical value, more particularly, more than approximately 2 $\mu$m, extends approximately concentrically so that the material to be worked and/or gases cannot pass beneath the annular washer through them. In accordance with the invention, the necessary axial surface sealing pressure is, therefore, applied directly between two adjacent work segments, i.e., two adjacent work segments (if desired, with a sealing member interposed between them) are directly clamped together so that variable stresses along the shaft for working material are practically eliminated from acting on the surface sealing pressures at the adjacent end faces of these work segments.

The sealing between the work segments, in accordance with the invention, even prevents gases from passing through the annular washers. Consequently, a machine comprising shafts for working material in accordance with the invention has the advantage that the vacuum which is often applied to degas the material is not weakened by air being sucked along the core shaft and between the work segments into the housing space accommodating the material to be worked.

In realizing the basic concept underlying the invention, the manner in which the work segments are mounted for rotation with the core shaft is unimportant. For example, connections by means of longitudinal grooves in the core shaft and in the work segments and keys inserted in these longitudinal grooves are common; toothing and the like have, however, also been employed. The reference in the foregoing to an annular washer and a corresponding groove does not, of course, mean that the annular washer and the groove must be of circular configuration; it is quite feasible for other groove and washer shapes, also such as are not concentric with the core shaft axis, to be used. Furthermore, the adjacent work segments must not necessarily directly abut one another with their end faces, but can accommodate between them other segments whose end faces adjacent the work segments are designed in accordance with the invention.

Solid annular washers may be used, but gas filled O rings having the further advantage that temperature increases permit an increase in the surface sealing pressures are preferred.

To produce the forces pulling two adjacent work segments together in an axial direction, an annular sealing segment is arranged in a first embodiment of the shaft for working material in accordance with the invention between adjacent work segments, and bayonet-lock-type couplings are arranged between the work segments and the sealing member. It is, however, also possible to use such bayonet-lock-type couplings to directly connect adjacent sealing segments such that these couplings pull the adjacent end faces of the work segments together.

In a preferred embodiment, there is provided for each work segment at least one axially extending tension rod which can be screwed to the tension rod of an adjacent work segment, with tension rod and associated work segment being provided with stop members cooperating in at least one axial direction. It is then easy to push the work segments onto the core shaft one after the other and tighten them against the end face of the preceding work segment by tightening the tension rod belonging to the newly positioned work segment. It is expedient to provide several, preferably three, tension rods arranged at the same angular distances from one another for each work segment. Instead of screwing the tension rods together, other suitable connecting means subject to tensile forces may also be selected.

Finally, it is possible to fill the cavities between the core shaft and the inside of the work segments up to the annular washers with a gas, a lubricating agent or any other gaseous, liquid or pasty substance which is inert with respect to the material of the material working shaft. This substance should preferably be at a pressure above atmospheric so as to prevent at all costs gases or the like forming during the working of the material from passing from the outside between the work segments into the material to be worked.

Further features, advantages and details of the invention are apparent from the enclosed claims and/or the following description and enclosed drawings of two preferred embodiments of the material working shaft according to the invention.

Figure 1:
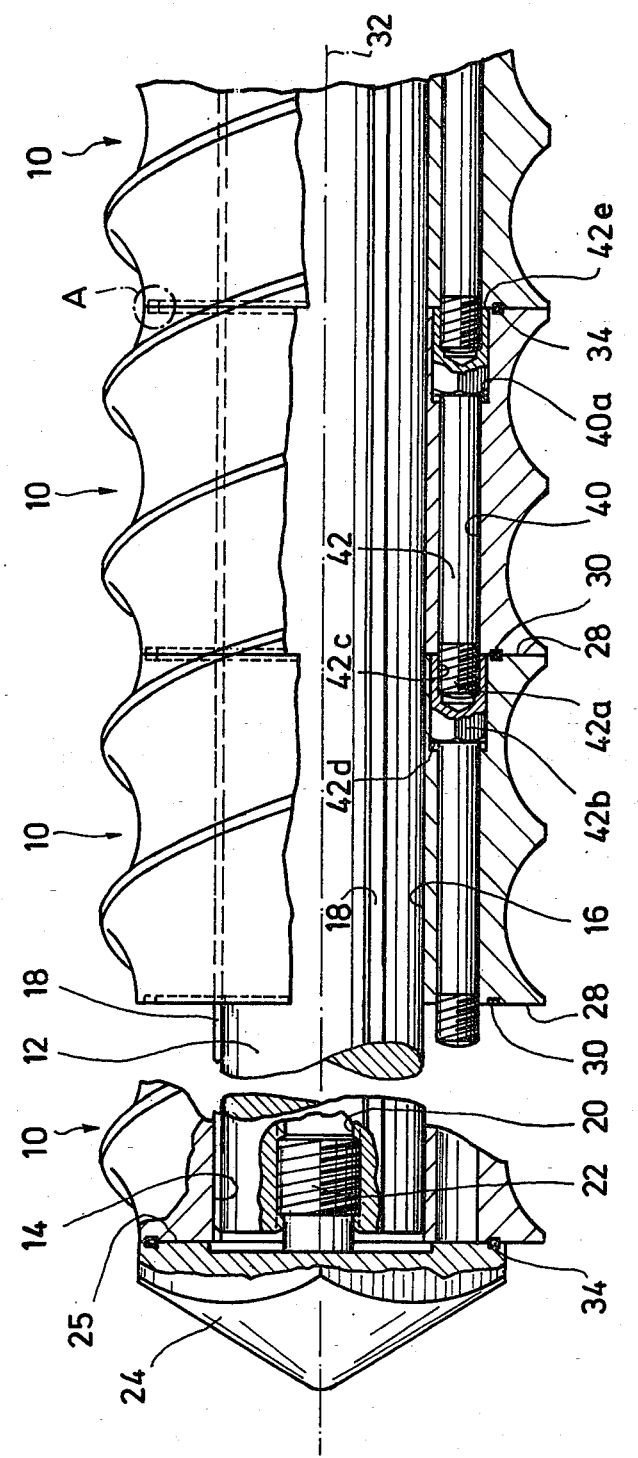
FIG. 1 is a side and sectional view of part of the first embodiment.
Figure 2:
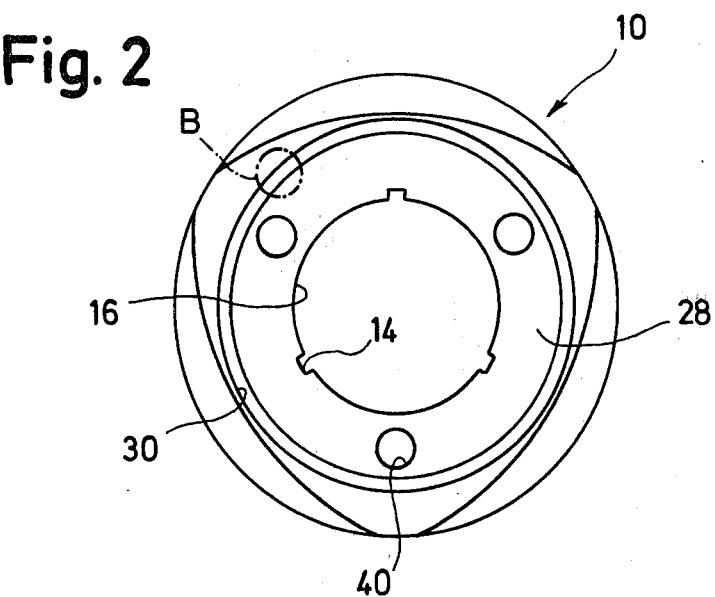
FIG. 2 is a front end view of one of the work segments of the first embodiment.
Figure 2A:
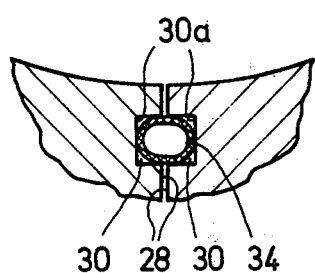
FIG. 2a shows section "A" of FIG. 1 on a larger scale than in FIG. 1.

In the embodiment shown in FIGS. 1 and 2, work segments 10 in the form of so-called screw sleeves are arranged in a row immediately behind one another on a core shaft 12 and are mounted for rotation therewith, for example, by means of several axially extending grooves 14 in the walls of the work segment bores 16 and keys 18 which are integral with the core shaft 12 and fit into these grooves. The shaft for working material is driven at the one end which is not illustrated, and at the other end shown in FIG. 1 the core shaft 12 comprises a central threaded bore 20 having a threaded stub 22 of an end disc 24 screwed into it.

As shown in FIG. 2, the end faces 28 of the work segments 10 comprise in accordance with the invention an annular groove 30 which is preferably of U-shaped cross-section and extends concentrically with the shaft axis 32. An annular washer 34 which in accordance with the invention is in the form of a gas filled O ring, is inserted in the annular grooves 30 of the adjacent end faces 28 of two adjacent work segments 10. The depth of the annular grooves 30 is measured in relation to the cross-section of the annular washers 34 such that the annular washers are pressed against the groove bottom 30a of each annular groove with the desired surface sealing pressure when the end faces 28 of adjacent work segments 10 rest at least almost against one another.

Figure 2B:
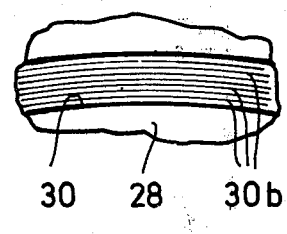
FIG. 2b shows section "B" of FIG. 2 on a highly enlarged scale.

As is apparent from FIG. 2b showing section "B" from FIG. 2, at least the groove bottom 30a is machined in accordance with the invention such that the machining indentations 30b with a peak-to-valley height exceeding a critical value extend at least approximately concentrically with the shaft axis 32 so as to prevent the material to be worked or any gases along radially extending machining indentations or groove-like tool marks from passing under the annular washer 34.

As shown in FIG. 1, the inside front end 25 of the end disc 24 is constructed in accordance with the invention in the same manner as the end faces 28 of the work segments 10 and an annular washer 34 is likewise disposed between the end disc 24 and the adjacent work segment.

Each of the sleeve-type work segments 10 comprises three longitudinal bores 40, which are arranged, in accordance with the invention, at the same angular distances from one another and are in the form of stepped bores so as to each comprise a shoulder 40a. Furthermore, each of these longitudinal bores 40 accommodates a tension rod 42 which is expediently constructed as a threaded bolt 42a at its one end and provided at its other end with a many-sided head 42b comprising a central threaded bore 42c into which the threaded bolt 42a of the adjacent tension rod can be screwed. In the preferred embodiment of the invention, the many-sided head 42b also forms an annular shaped inside stop surface 42d and a likewise annular shaped outside end surface 42e, with whose help each of the work segments 10 can be axially tightened in accordance with the invention against the work segment located adjacent it on the one side: in the first work segment 10 which is pushed onto the core shaft 12 from the left to the right as viewed in FIG. 1, the multi-cornered heads 42b of the tension rods 42 associated with this work segment should rest with their internal stop surfaces 42d against the shoulders 40a of the longitudinal bores 40. Then the tension rods of the next work segment to be pushed onto the core shaft 12 are screwed onto the tension rods 42 of the outermost work segment and their multiple-cornered heads 42b tightened on the threaded bolt 42a of the work segment which is already positioned on the core shaft, whereupon the next work segment 10 is pushed across the core shaft and across the associated tension rods which have already been mounted. When the tension rods 42 associated with the third work segment are then screwed onto the tension rods associated with the second work segment and the exterior end faces 42b of the tension rods of the third work segment 10 are tightened against the end face 28 of the second work segment that is still free, the adjacent end faces 28 of the first and second work segments 10 are drawn together and the necessary surface sealing pressures created at the annular washer 34 located between them. When all of the work segments have been positioned in this manner, the end disc 24 is screwed on. It is, of course, also possible to first join the work segments 10 to one another with the help of the tension rods 42 and only then push them onto the core shaft 12.

In accordance with the invention, all machining indentations larger than approximately 2 μm in those areas of the end faces 28 against which the annular washers 34 are pressed, extend at least approximately concentrically with the shaft axis 32, while machining indentations with a peak-to-valley height of less than approximately 2 μm may also extend in a radial direction.

Figure 4:
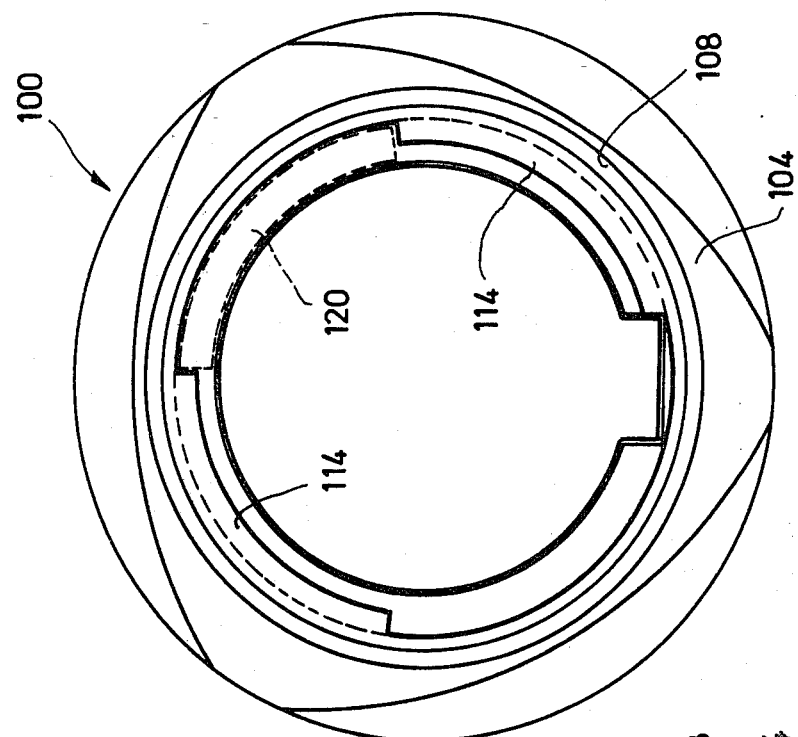
FIG. 4 is a front end view of the work segment shown in FIG. 3.
Figure 3:
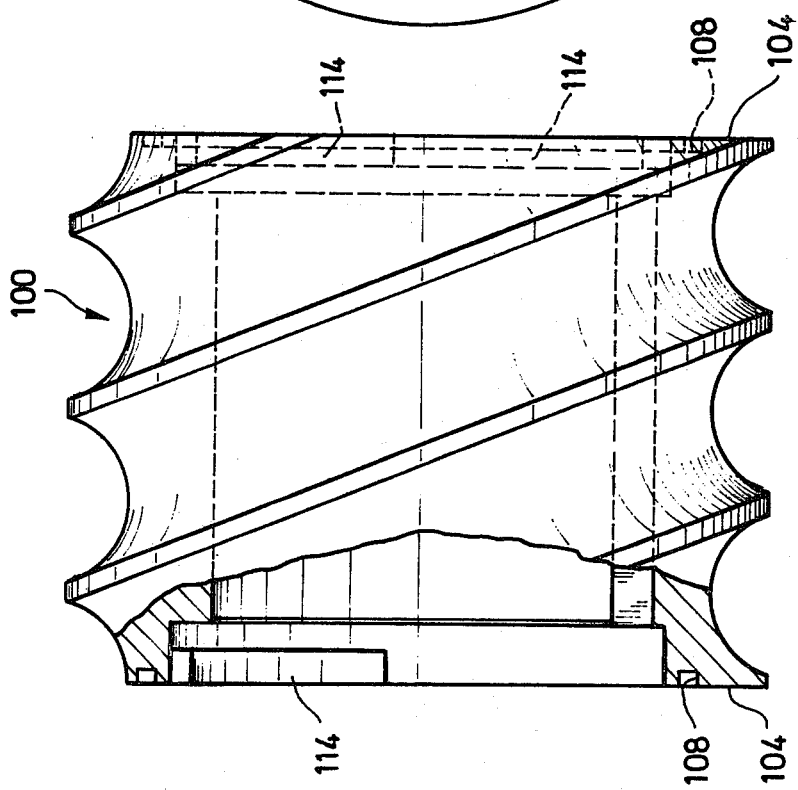
FIG. 3 is a side view of a work segment of the second embodiment.
Figure 6:
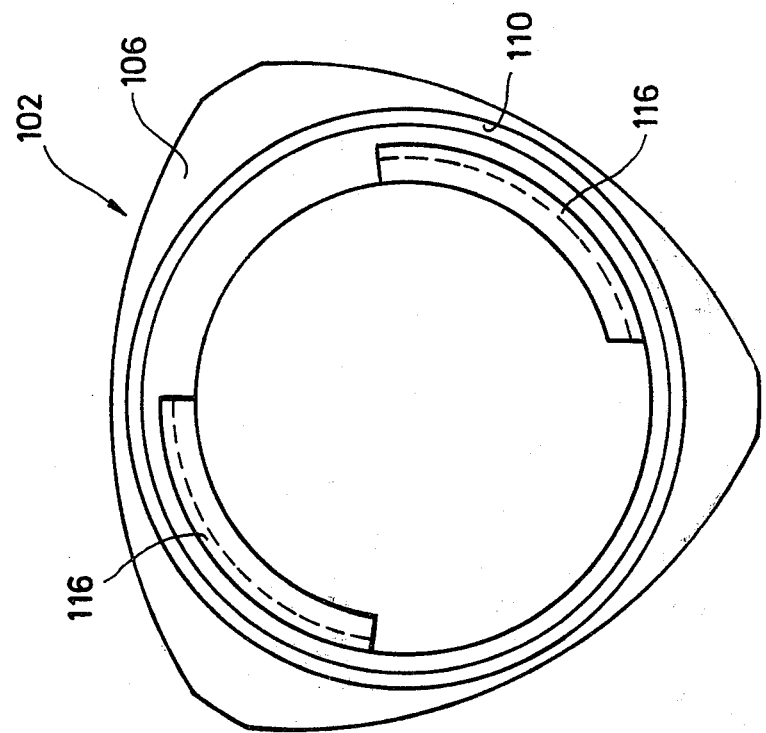
FIG. 6 is a front end view of this sealing segment.
Figure 5:
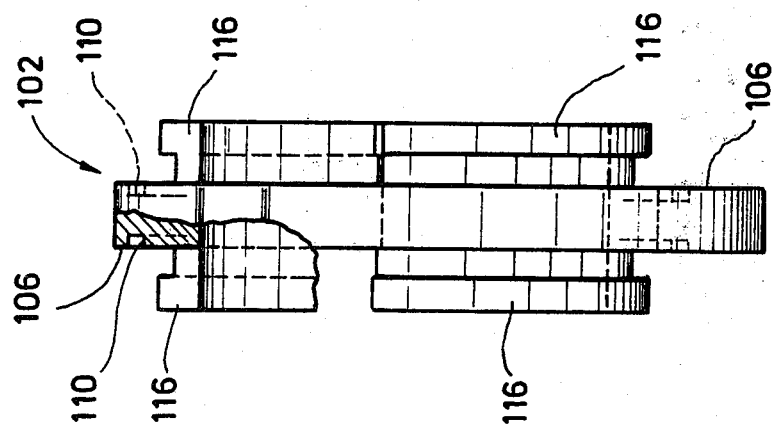
FIG. 5 is a side view of a sealing segment of the second embodiment.

In the embodiment shown in FIGS. 3 to 6, a sealing segment 102 is arranged as coupling member between two adjacent work segments 100, one of which is shown in FIGS. 3 and 4. The end faces 104 and 106 of the work segments 100 and the sealing segments 102 comprise in accordance with the embodiment shown in FIGS. 1 and 2 annular grooves 108 and 110 for insertion of annular washers which are not illustrated. In accordance with the invention, the tension rods are, however, replaced by bayonet-lock-type coupling members 114 and 116 at the work and sealing segments which enable the end faces 104 and 106 to be drawn together. Therefore, in accordance with the invention the sealing forces in this embodiment, too, are created between adjacent work segments.

Since the coupling members 114 and 116 overlap when mounted, a locking insert 120 shown in dashed lines in FIG. 4 can be pushed along the core shaft into the spaces left by the coupling members and then lock the coupling members so that they are prevented from becoming disengaged unintentionally.

I claim:

1. Processing shaft for working materials of solid, liquid, plastic and/or highly viscous consistency, comprising:
   (a) a driving shaft and at least three sleeve-type work segments arranged to be mounted on said driving shaft for rotation therewith;
   (b) each of said work segments including end faces, adjacent end faces of adjacent work segments abutting against each other;
   (c) at least one clamping device associated with each two of said adjacent end faces for sealingly pressing said adjacent end faces against each other in axial direction;
   (d) at least one of each of said adjacent end faces being provided with an endless groove extending around the driving shaft; and
   (e) a washer received in said groove for being compressed between adjacent end faces.

2. Processing shaft as defined in claim 1 wherein in at least one annular zone of each of said adjacent end faces against which said washer is pressed any machining indentations having a peak-to-valley height of more than approximately 2 μm extend approximately concentric to said driving shaft.

3. Processing shaft as defined in claim 1 wherein said clamping device is an axially-extending tension rod which can be screwed to the tension rod of an adjacent work segment, and wherein said tension rod and associated work segment are provided with stop means cooperating in at least one axial direction.

4. Processing shaft as defined in claim 3 wherein the tension rod comprises at its one end a head with a threaded bore and a multiple-cornered exterior and at its other end an external thread corresponding to the threaded bore.

5. Processing shaft as defined in claim 3 wherein several tension rods arranged at the same angular distance from one another are provided for each work segment.

6. Processing shaft for working materials of solid, liquid, plastic and/or highly viscous consistency, comprising:
   (a) a driving shaft and at least three sleeve-type work segments arranged to be mounted on said driving shaft for rotation therewith;
   (b) a coupling member disposed between each pair of adjacent work segments;
   (c) said adjacent work segments and said coupling member having abutting end faces;
   (d) at least one clamping device associated with each pair of said abutting end faces for sealingly pressing said abutting end faces against each other in axial direction;
   (e) at least one of each pair of said abutting end faces having an endless groove therein extending around said driving shaft; and
   (f) a washer received in said groove for being compressed between said abutting end faces.

7. Processing shaft as defined in claim 1 or 6 wherein said washer is a gas-filled O-ring.

8. Processing shaft as defined in claim 1 or 6 wherein cavities are provided between said driving shaft and said work segments, said cavities being filled up to said washer with a fluid out of the group comprising gases, lubricating agents, liquids and pasty substances, which fluid is inert with respect to the material of the processing shaft.

9. Processing shaft as defined in claim 6 wherein in at least one annular zone of each of said abutting end faces against which said washer is pressed any machining indentations having a peak-to-valley height of more than approximately 2 μm extend approximately concentric with said driving shaft.

10. Processing shaft as defined in claim 6 wherein said clamping device comprises bayonet-lock-type coupling elements.

11. Processing shaft as defined in claim 10 wherein a locking member for locking said coupling elements is insertable in an axial direction between said driving shaft and the work segments.

* * * * *